(12) United States Patent
Mihara et al.

(10) Patent No.: US 9,285,875 B2
(45) Date of Patent: Mar. 15, 2016

(54) INFORMATION PROCESSING APPARATUS AND INFORMATION PROCESSING METHOD

(71) Applicant: FUJITSU LIMITED, Kawasaki-shi, Kanagawa (JP)

(72) Inventors: Motonobu Mihara, Kawasaki (JP); Akinori Taguchi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/477,132

(22) Filed: Sep. 4, 2014

(65) Prior Publication Data

US 2015/0077334 A1    Mar. 19, 2015

(30) Foreign Application Priority Data

Sep. 13, 2013   (JP) .................................. 2013-191156

(51) Int. Cl.
 G09G 5/00    (2006.01)
 G06F 3/01    (2006.01)
 G06F 17/21   (2006.01)

(52) U.S. Cl.
 CPC .............. *G06F 3/013* (2013.01); *G06F 17/211* (2013.01)

(58) Field of Classification Search
 CPC .......... G06F 3/016; G06F 3/011; G06F 3/038
 USPC .......................................... 345/7–9, 156–158
 See application file for complete search history.

(56) References Cited

U.S. PATENT DOCUMENTS

| 6,246,779 B1 * | 6/2001 | Fukui ................. G06K 9/00268 382/100 |
| 6,873,314 B1 | 3/2005 | Campbell |
| 2012/0131491 A1 | 5/2012 | Lee |
| 2012/0256967 A1 | 10/2012 | Baldwin et al. |
| 2014/0184550 A1 * | 7/2014 | Hennessey .............. G06F 3/013 345/173 |

FOREIGN PATENT DOCUMENTS

| JP | 8-22385 | 1/1996 |
| JP | 2006-107048 | 4/2006 |

OTHER PUBLICATIONS

Extended European Search Report issued Mar. 5, 2015 in corresponding European Patent Application No. 14183337.6.
Kai Kunze et al., "The Wordometer-Estimating the Number of Words Read Using Document Image Retrieval and Mobile Eye Tracking", 2013 12th International Conference on Document Analysis and Recognition, pp. 25-29.

* cited by examiner

*Primary Examiner* — Kimnhung Nguyen
(74) *Attorney, Agent, or Firm* — Staas & Halsey LLP

(57) ABSTRACT

An information processing apparatus, includes: a memory, and a processor coupled to the memory and configured to: obtain a gaze position of a user on a display screen, determine whether an object for reading, displayed on the display screen, has been finished reading by the user, based on a threshold and the number of times where movement of the gaze position indicates a newline, the threshold being set in accordance with the number of lines in the object, and change at least one of the threshold and the number of times in response to detection that the movement of the gaze position becomes movement of a certain distance or greater in a second direction different from a first direction of movement indicating a newline.

12 Claims, 20 Drawing Sheets

FIG. 1
RELATED ART

In spring it is the dawn that is most beautiful. As the light creeps over the hills, their outlines are dyed a faint red and wisps of purplish cloud trail over them. In summer

1100 In spring it is the dawn that is most beautiful. As the light creeps over the hills, their outlines are dyed a faint red and wisps of purplish cloud trail over them. In summer

FIG. 10

| DOCUMENT ID | FIRST DETERMINATION AREA | | SECOND DETERMINATION AREA | | DISTANCE THRESHOLD Hmin | NUMBER OF LINES | NUMBER-OF-TIMES THRESHOLD | LINE SPACING | CHANGE FLAG | DETERMINATION FLAG |
|---|---|---|---|---|---|---|---|---|---|---|
| | COORDINATES A | COORDINATES B | COORDINATES A | COORDINATES B | | | | | | |
| A0001 | (xa, ya) | (xb, yb) | (xc, yc) | (xd, yd) | Mth | 10 | 9 | L | OFF | ON |
| ... | ... | ... | ... | ... | ... | ... | ... | ... | ... | ... |

INFORMATION PROCESSING APPARATUS AND INFORMATION PROCESSING METHOD

CROSS-REFERENCE TO RELATED APPLICATION

This application is based upon and claims the benefit of priority of the prior Japanese Patent Application No. 2013-191156 filed on Sep. 13, 2013, the entire contents of which are incorporated herein by reference.

FIELD

The embodiments discussed herein are related to technology for determining whether an object for reading has been read.

BACKGROUND

As a screen rendering and updating method for information terminals such as personal computers, tablets, smart phone terminals, and kiosk terminals, technology that detects the gaze of a user and switches display content on the screen or performs a scroll operation in accordance with the gaze movement is available. Specifically, display on the screen is switched or the screen is scrolled after determining whether a specific area or the like has been read, thereby moderating the operation burden on the user.

In addition, the following technology that performs gaze-based screen control or the like is available. That is, a determination area is provided on an object for reading, such as text, content or the like. In the case where the coordinates of the gaze of a user are detected in that determination area, it is determined that the user is referring to that determination area. In the case where the order of parts to which the user has referred matches a predetermined order, it is determined that the user has read the object for reading, and gaze-based screen control or the like is performed.

SUMMARY

According to an aspect of the invention, an information processing apparatus, includes: a memory, and a processor coupled to the memory and configured to: obtain a gaze position of a user on a display screen, determine whether an object for reading, displayed on the display screen, has been finished reading by the user, based on a threshold and the number of times where movement of the gaze position indicates a newline, the threshold being set in accordance with the number of lines in the object, and change at least one of the threshold and the number of times in response to detection that the movement of the gaze position becomes movement of a certain distance or greater in a second direction different from a first direction of movement indicating a newline.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 is a diagram for describing an example of coordinates of a gaze position output by a gaze detecting device;

FIG. 2 is a diagram for describing an example of coordinates of a gaze position output by a gaze detecting device;

FIG. 3 is a diagram for describing the outline of embodiments;

FIG. 10 is a diagram illustrating an example of data stored in a third data storage unit;

DESCRIPTION OF EMBODIMENTS

Hereinafter, embodiments will be described with reference to the drawings.

While inventing the present embodiments, observations were made regarding a related art. Such observations include the following, for example.

Figure 2:
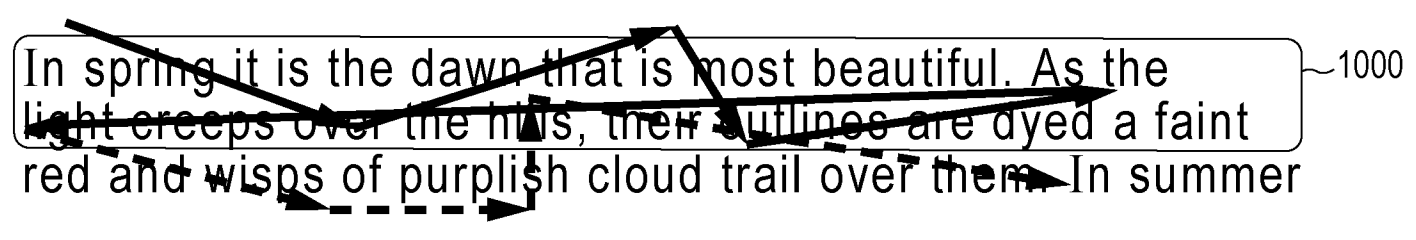

In the case of the related art, when no coordinates of the gaze are detected in a determination area on text or content, as an example of an object for reading, subjected to determination of whether the text or content has been reading, whether the user has read the text or content is undeterminable. For example, if the accuracy of the coordinates of the gaze position, output by a gaze detecting device, is relatively high, as illustrated in FIG. 1, it is possible to determine in a determination area 1000 that, after the user has read the first line, as indicated by a bold line, the user has read the second line, as indicated by a bold dotted line. However, the accuracy of the coordinates of the gaze position, output by the gaze detecting device, may be low, and a detection error may be rougher than the size of characters of the text (each line) or content. In such a case, as illustrated in FIG. 2, the gaze position may not be accommodated in the determination area 1000 or may move across lines. Even if the user has finished reading the text or content, if the coordinates of the gaze position output by the gaze detecting device are simply tracked, it is impossible to detect whether the user has finished reading the text or content.

Accordingly, it is an object in one aspect of embodiments discussed herein to provide techniques for accurately determining whether an object for reading, such as text, content or the like, has been finished reading, even when the accuracy of the coordinates of a gaze position, output by a gaze detecting device, are relatively low.

First Embodiment

In a first embodiment, even when the accuracy of the coordinates of a gaze position, output by a gaze detecting device, are relatively low, in the case of text written from left to right, as an example of text of a line configuration, such as that illustrated in FIG. 3 (the same as FIG. 2), when a user reads the next line, the gaze moves from right to left, such as that indicated by an arrow 1100. This embodiment pays attention to the occurrence of such a gaze movement. By counting the number of occurrences of movement of the gaze position, which occurs when a user reads text and which corresponds to a newline (may also be referred to as a "line break"), whether text in a determination area has been read (has been finished reading) is determined.

Figure 4:
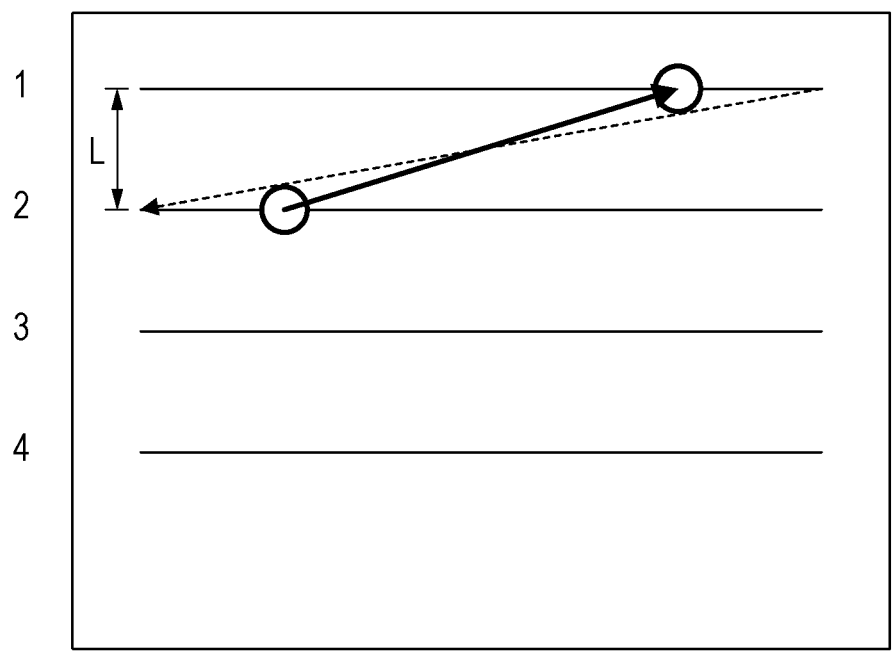
FIG. 4 is a diagram for describing the outline of the embodiments.

However, actually, a user not only reads down the lines from the top, but also regresses back to previous lines and re-reads the lines. For example, as schematically illustrated in FIG. 4, there are cases in which, when a user finishes reading the first line (here, the lines of text are indicated by horizontal lines in order to simplify the illustration), there is a line break to the second line (dotted arrow), the user continues reading through the second line, and the user regresses back to an end portion of the first line (solid arrow). When the user performs such a regression, it is assumed that, for a newline represented by the dotted arrow, the number of times a newline is detected, which is counted in determination of whether text has been read, is decreased, or a threshold of the number of times a newline is detected, which is determined from the number of lines of text, is increased.

Figure 5:
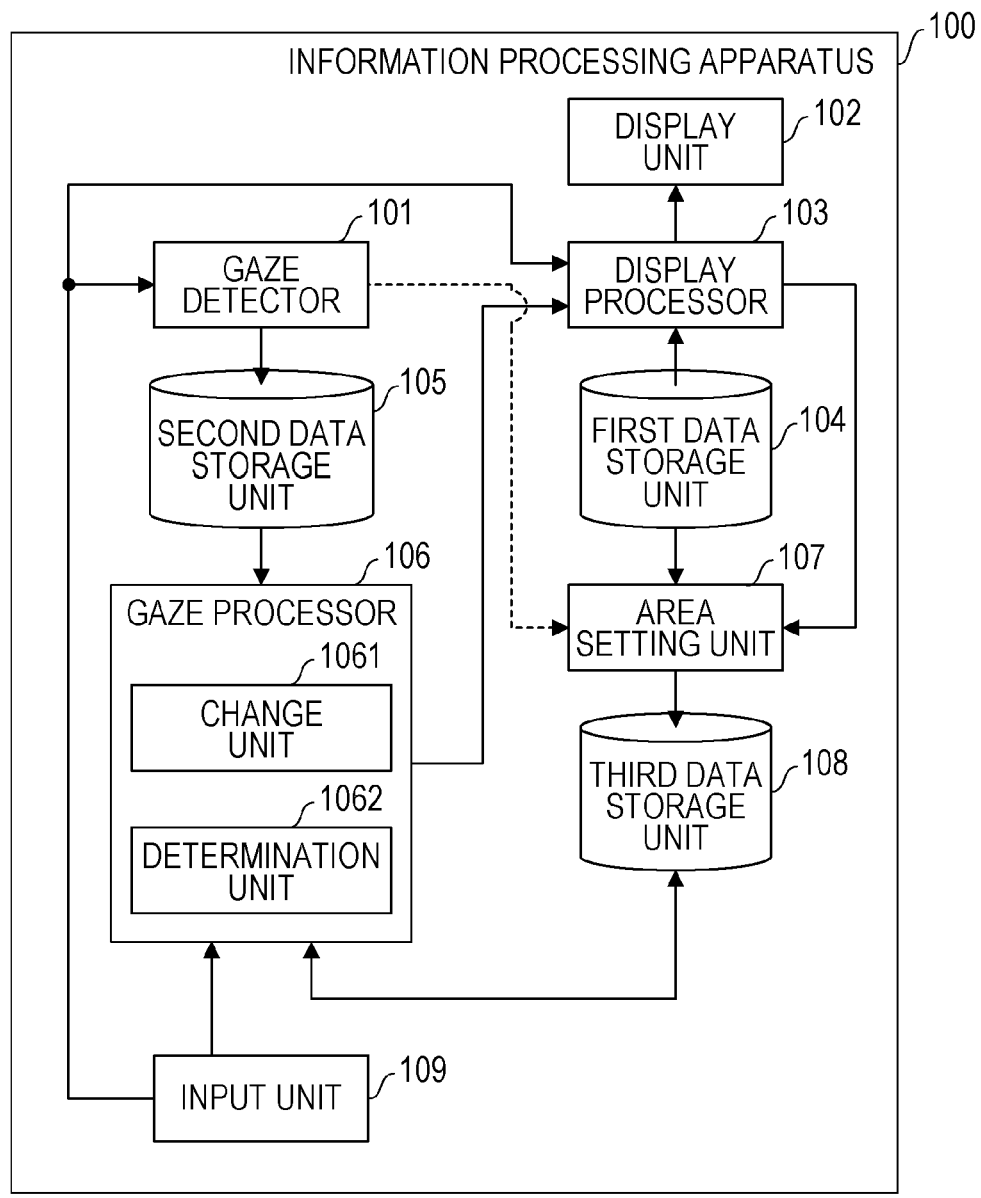
FIG. 5 is a functional block diagram of an information processing apparatus according to the embodiments.

FIG. 5 is a functional block diagram of an information processing apparatus according to this embodiment. An information processing apparatus 100 according to this embodiment includes a gaze detector 101, a display unit 102, a display processor 103, a first data storage unit 104, a second data storage unit 105, a gaze processor 106, an area setting unit 107, a third data storage unit 108, and an input unit 109.

The gaze detector 101 detects the coordinates of the gaze position on a display screen of the display unit 102, and stores the coordinates in the second data storage unit 105. In this embodiment, since the gaze detector 101 may be configured with any available mechanism and algorithm, a detailed description thereof is omitted.

The first data storage unit 104 stores text data subjected to determination of whether a user has read the text, range data set for the text, and setting data. The display processor 103 reads the text data stored in the first data storage unit 104, and outputs the data to the display unit 102. At this time, the display processor 103 outputs coordinate data of an area on a display screen of the display unit 102 and data used in the area setting unit 107 (for example, including the length of line spacing and the like), which corresponds to the above-mentioned range, to the area setting unit 107.

The area setting unit 107 uses the setting data and the like stored in the first data storage unit 104 and data output from the display processor 103 to generate data of a first determination area and a second determination area described later, and stores the data in the third data storage unit 108.

The gaze processor 106 includes a change unit 1061 and a determination unit 1062. For example, in response to an instruction from the input unit 109, the determination unit 1062 determines whether text in the first determination area, stored in the third data storage unit 108, has been read, on the basis of the coordinates of the gaze position, stored in the second data storage unit 105, and stores the determination result in the third data storage unit 108. The gaze processor 106 additionally causes the display processor 103 to output the determination result to the display unit 102. In addition, the change unit 1061 determines whether a situation such as that schematically illustrated in FIG. 4 has occurred. In the case of the occurrence of such a situation, the change unit 1061 changes the threshold of the number of times a newline is detected, or the number of times a newline is detected. In the case of changing the threshold, the change unit 1061 stores the changed threshold in the third data storage unit 108.

Figure 6:
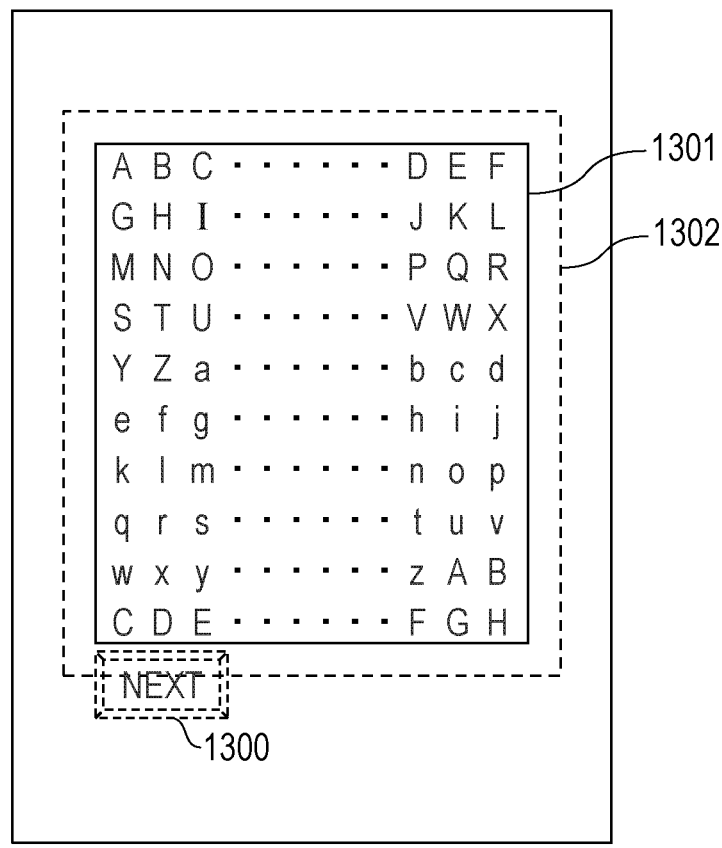
FIG. 6 is a diagram for describing determination areas.

Next, using FIG. 6, determination areas used in a process of determining whether text has been read will be described. FIG. 6 illustrates an example of a display screen of the display unit 102. The display screen includes text, and a button 1300 for entering that the text has been read. In this embodiment, a range for determining whether text has been read is set in advance for that text. In the example illustrated in FIG. 6, text from "ABC" at the left end of the first line to "FGH" at the right end of the tenth line is stored as document data in the first data storage unit 104, and further, the range of this text is stored as range data. A rectangular (such as a minimum rectangular) area 1301 surrounding the text in this range is a first determination area. The display processor 103 outputs data of coordinate data representing the first determination area (such as the coordinate values of the upper-right vertex and the lower-left vertex, or the coordinate values of the upper-left vertex and the lower-right vertex) and data used in a process performed by the area setting unit 107 (for example, when the direction of reading is set to be from left to right, the coordinate values of the left-end character and the right-end character) to the area setting unit 107. The area setting unit 107 sets, for the area 1301, an area 1302 as a second determination area on the basis of a gaze detection error included in setting data (an error (length in this case) of the coordinate values output by the gaze detector 101). In the case where the coordinates of the gaze position fall within this second determination area, the determination unit 1062 determines whether gaze movement satisfies a condition(s) described later. Note that, in FIG. 6, the area 1302 is broader than the area 1301 and the area 1302 includes the area 1301. Alternatively, the area 1302 and the area 1301 may have the same range, or the area 1302 may not include the area 1301.

Figure 7:
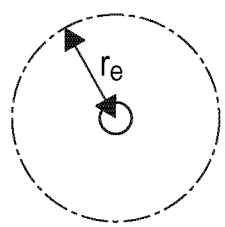
FIG. 7 is a diagram for describing a gaze detection error.
Figure 8:
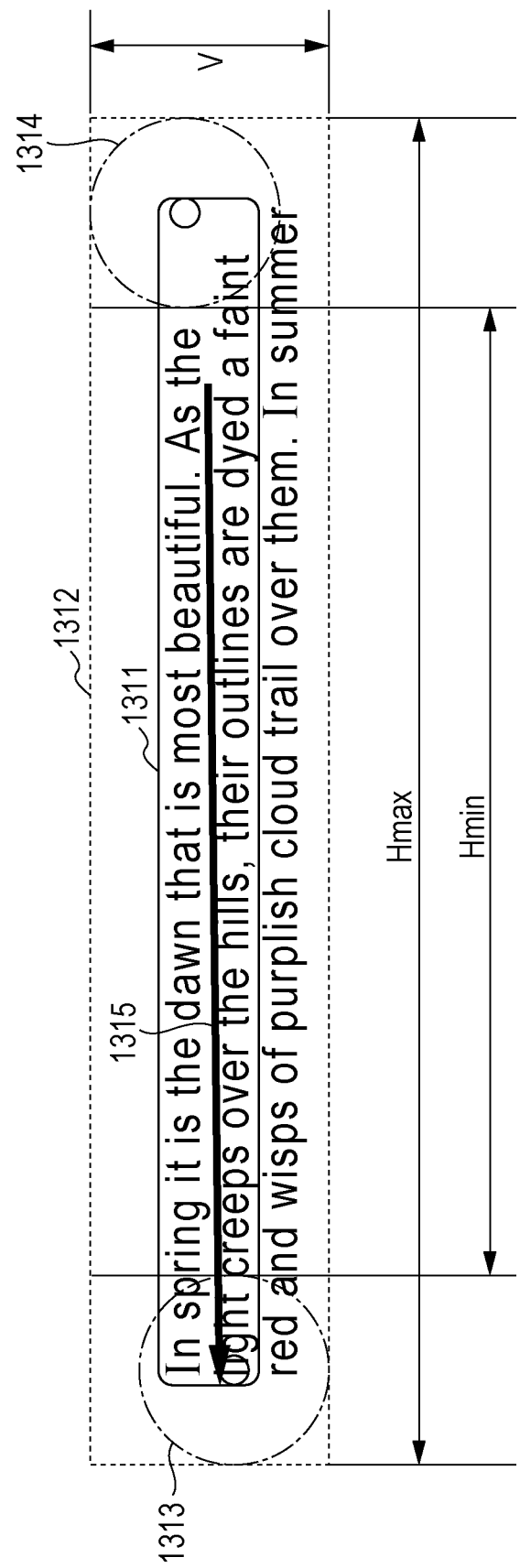
FIG. 8 is a diagram for describing the determination areas.

Next, a setting example of the second determination area will be described using FIGS. 7 and 8. In this setting example, a setting method using a gaze detection error $r_e$ is adopted. When a user looks at a certain position, the coordinates of the position fall within a circle that is centered at the position and that has the radius $r_e$, as illustrated in FIG. 7. Therefore, as illustrated in FIG. 8, in the case where the true gaze position comes to the right-end character in a first determination area 1311, the coordinates of the gaze position from the gaze detector 101 may represent an arbitrary position in a circle 1314 with the radius $r_e$. Similarly, in the case where the true gaze position comes to the left-end character in the first determination area 1311, the coordinates of the gaze position from the gaze detector 101 may represent an arbitrary position in a circle 1313 with the radius $r_e$.

Therefore, the length Hmax from the left end of the circle 1313 to the right end of the circle 1314 is adopted as the horizontal length of the second determination area. If the left-end character were virtually moved to the bottom line while maintaining the coordinate in the horizontal direction and the right-end character were virtually moved to the top line while maintaining the coordinate in the horizontal direction (FIG. 8 is already in this state), a rectangle that circumscribes the circle 1313, which is centered at the center of the left-end character after the movement and which has the radius $r_e$, and the circle 1314, which is centered at the center of the right-end character after the movement and which has the radius $r_e$, is adopted as a second determination area 1312. Note that the four corners of the second determination area 1312 may be rounded by the arc with the radius $r_e$. In addition, the length V in the vertical direction of the second determination area 1312 is the length between the bottom end of the circle 1313, which is centered at the center of the left-end character after the movement and which has the radius $r_e$, and the top end of the circle 1314, which is centered at the center of the right-end character after the movement and which has the radius $r_e$.

In the case where the user finishes reading the right-end character of the first line and then continues reading the left-end character of the second line, the gaze detection error being taken into consideration, the gaze position moves by the length Hmin from the left end of the circle 1314 set at the right-end character of the first line to the right end of the circle 1313 set at the left-end character of the second line, which is the case of the shortest movement distance. In the case of the longest movement distance, the gaze position moves by the horizontal length Hmax of the second determination area 1312. That is, in the case where there is a line break, the coordinates of the gaze position move by Hmin to Hmax in a direction opposite to the direction of reading text in the first determination area (an arrow 1315 in FIG. 8). At any rate, in the case where there is a line break, the gaze position moves by Hmin at minimum in the second determination area 1312. This movement by Hmin at minimum of the gaze position is detected. Although a determination may be performed in the sense of Euclidean distance, if a positive direction of the x-axis or y-axis is set as the reading direction, for example, it may be confirmed that the difference between the x-coordinate value or the y-coordinate value of the position before the movement and the x-coordinate value or the y-coordinate value of the position after the movement is greater than or equal to the threshold Hmin of the movement distance.

Note that, to simplify the setting of the second determination area 1312, the boundary of the second determination area 1312 may be set to be outside of the boundary of the first determination area 1311 by the gaze detection error $r_e$.

In addition, the movement distance threshold may be set on the basis of a readable area representing a range that a user is able to read at one time. In this embodiment, it is assumed that, for the readable area, for example, data of an average user is stored as setting data in the first data storage unit 104.

Figure 9:
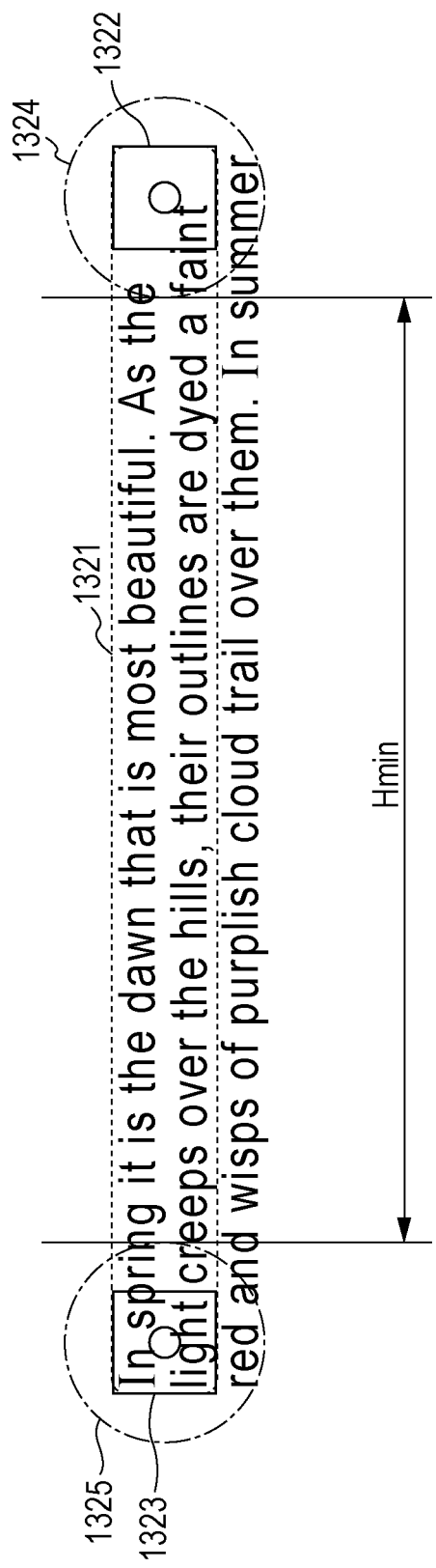
FIG. 9 is a diagram for describing the determination areas.
Figure 11:
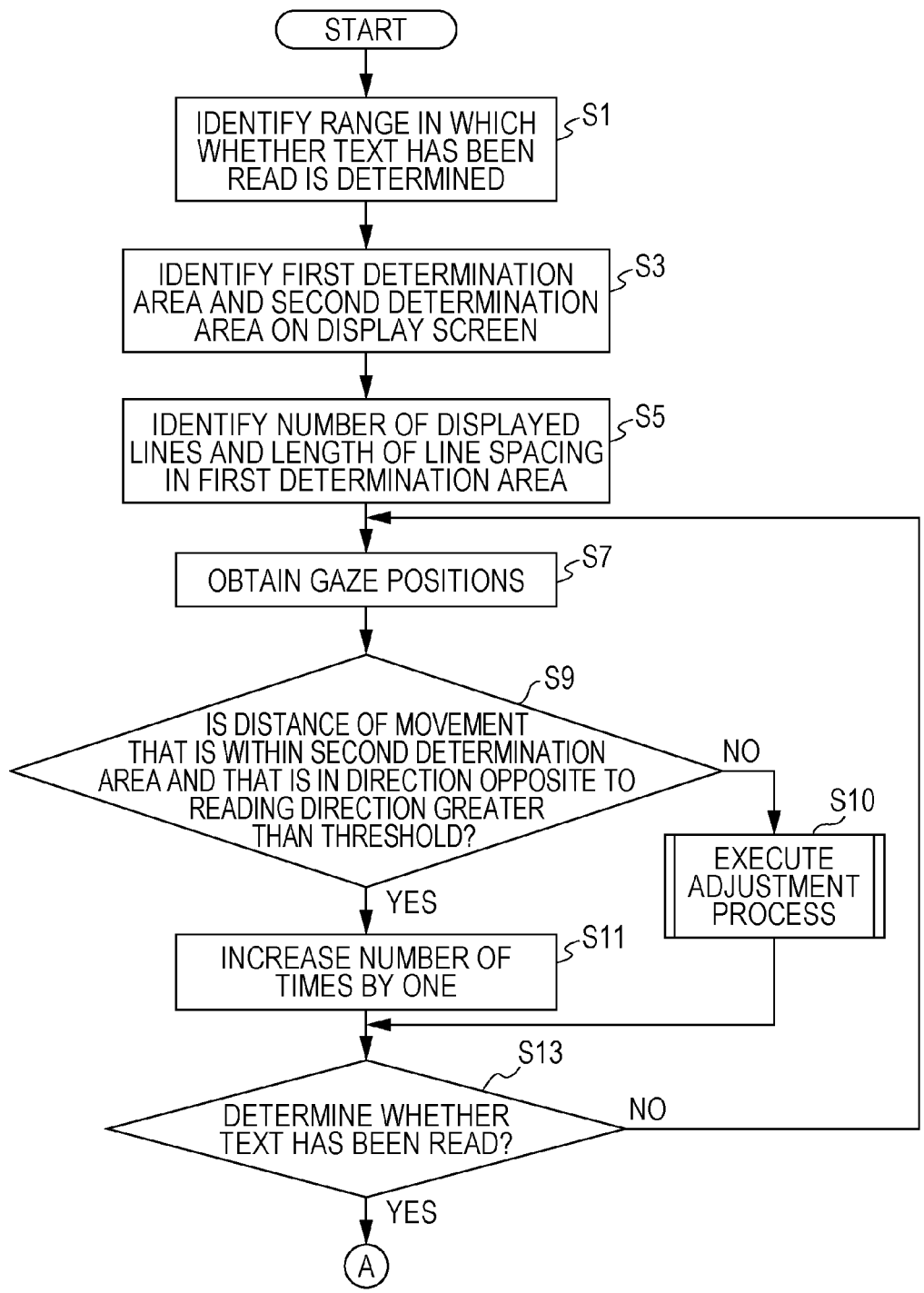
FIG. 11 is a flowchart illustrating a process according to a first embodiment.
Figure 12:
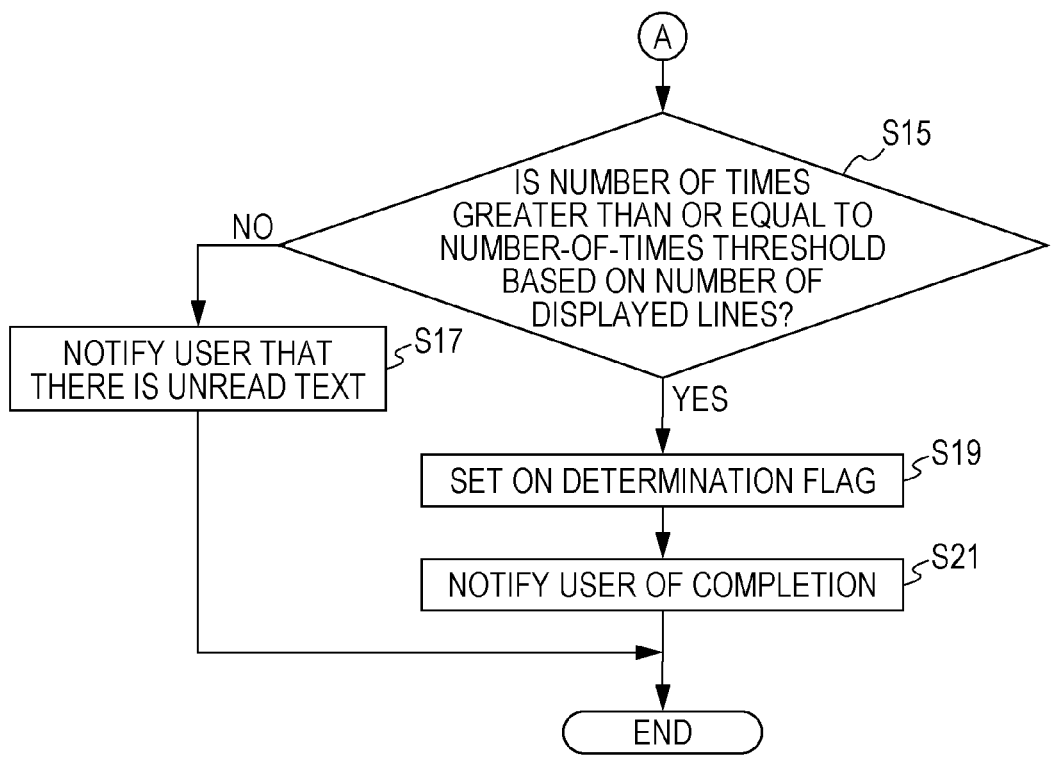
FIG. 12 is a flowchart illustrating the process according to the first embodiment.

The threshold Hmin may be set as illustrated in FIG. 9. That is, the right end of a readable area 1322 representing a range that a user is able to read at one time is arranged in agreement with the right end of a first determination area 1321, and a circle 1324 that has the gaze detection error $r_e$ as a radius is centered at the center of the readable area 1322 is arranged. Similarly, the left end of a readable area 1323 is arranged in agreement with the left end of the first determination area 1321, and a circle 1325 that has the gaze detection error $r_e$ as a radius is centered at the center of the readable area 1323 is arranged. The distance between the right end of the circle 1325 and the left end of the circle 1324 may be used as the distance threshold Hmin.

This is because of the following reason. That is, even when the gaze is not moved to the right-end character, if the gaze is moved such that a readable area includes the right-end character, text is readable to the right-end character. Similarly, even when the gaze is not moved to the left-end character, if the gaze is moved such that a readable area includes the left-end character, text is readable to the left-end character.

Next, FIG. 10 illustrates an example of data stored in the third data storage unit 108. In the example illustrated in FIG. 10, the data includes the document identification (ID) of a document including text subjected to determination of whether the text has been read, coordinate data defining the range of the first determination area (such as the upper left and lower right coordinate values), coordinate data defining the range of the second determination area (such as the upper right and lower left coordinate values), a threshold of the movement distance (hereafter referred to as a "movement distance threshold"), the number of lines of text included in the first determination area, the threshold of the number of times a newline is detected (hereinafter referred to as the "number-of-times threshold"), the length of line spacing, a change flag indicating whether the number of times a newline is detected or the threshold of the number of times a newline is detected has been changed, and a determination flag indicating whether text has been read. For the number of lines of text included in the first determination area, the number of lines may be included in text data in the first data storage unit 104, or, if the number of lines changes according to display, the number of displayed lines is identified by the display processor 103 or the like, for example. The length of line spacing is, as schematically illustrated in FIG. 4, the length L between the center of a line and the center of a line.

Next, the details of a process performed by the information processing apparatus 100 according to this embodiment will be described using FIGS. 11 to 15.

For example, in response to an instruction given by a user to display certain text using the input unit 109, the display processor 103 reads data of that text from the first data storage unit 104, and displays the text on the display unit 102. At this time, the display processor 103 identifies a range of the text subjected to determination of whether the text has been read, from range data stored in the first data storage unit 104 (step S1). The display processor 103 identifies coordinate data of a first determination area on the display screen of the display unit 102, and outputs the coordinate data to the area setting unit 107. In addition, the area setting unit 107 sets a second determination area so as to include the first determination area, taking into consideration a gaze detection error, and stores the coordinate data of the first determination area and the coordinate data of the second determination area in the third data storage unit 108 (step S3). A process performed by the area setting unit 107 is like a process described using FIG. 8. In addition, in this process, as illustrated in FIG. 8 or 9, the area setting unit 107 calculates a movement distance threshold Hmin, and stores the threshold Hmin in the third data storage unit 108.

In addition, the area setting unit 107 obtains data of the number of lines on the display screen (the number of lines in the reading direction; hereinafter referred to as "the number of displayed lines") from the display processor 103, or, in the case where the number of displayed lines is fixed, reads data of the number of displayed lines from the first data storage unit 104, and stores the data in the third data storage unit 108 (step S5). In this step, for example, the length of line spacing is also obtained from the display processor 103 and is stored in the third data storage unit 108. In addition, the area setting unit 107 calculates an initial number-of-times threshold from the number of displayed lines, and stores the number-of-lines threshold in the third data storage unit 108. For example, in this embodiment, the number of displayed lines −1 becomes the number-of-times threshold. In addition, the initial values of the change flag and the determination flag in the third data storage unit 108 are "off".

What has been described so far is a pre-process. In response to an instruction to display certain text using the input unit 109, the gaze detector 101 detects the coordinates of the gaze position, and stores the gaze position coordinates along with a time in the second data storage unit 105.

The determination unit 1062 reads data of the coordinates of the newest gaze position and the coordinates of the gaze position one unit time ago, which are stored in the second data storage unit 105 (step S7). Accordingly, the positions before and after the movement are identified on the display screen, thereby calculating the movement distance. Note that, in this embodiment, as has been described above, the movement distance may be Euclidean distance or the difference between coordinate values in an axis direction parallel to the reading direction.

On the basis of the coordinate data of the second determination area and the distance threshold, stored in the third data storage unit 108, the determination unit 1062 determines whether the positions before and after the movement are within the second determination area, and whether the distance of the movement in a direction opposite to the text reading direction in the first determination area is greater than or equal to the distance threshold Hmin (step S9). That is, whether a line break has occurred is determined.

In the case where the positions before and after the movement are not within the second determination area or the distance of the movement in a direction opposite to the text reading direction in the first determination area is not greater than or equal to the threshold Hmin, the occurrence of a line break is not determined, and the change unit 1061 executes a process of adjusting the number-of-times threshold or the number of times a newline is detected (step S10). Thereafter, the process proceeds to step S13. Note that the flow of the overall process will be described first here, and then the details of the adjustment process will be described later.

In contrast, in the case where the positions before and after the movement are within the second determination area, and the distance of the movement in a direction opposite to the text reading direction in the first determination area is greater than or equal to the threshold Hmin, the occurrence of a line break is determined. The determination unit 1062 increases the number of times a newline is detected by one (step S11), and determines whether an instruction is given from the user to determine whether text has been read via the input unit 109 (step S13). For example, whether the "next" button 1300 illustrated in FIG. 6 has been pressed is determined. In the case where no instruction to determine whether text has been read is given, the process returns to step S7. In contrast, in the case where an instruction to determine whether text has been read is given, the process proceeds to a process illustrated in FIG. 12 via a terminal A.

The determination unit 1062 determines whether the number of times a line break is detected is greater than or equal to the number-of-times threshold (step S15). As has been described earlier, in the case of simple text like that illustrated in FIG. 6 (the number of displayed lines −1) becomes the threshold in the case of reading the entire text. If the number of times a newline is detected is less than the number-of-times threshold based on the number of displayed lines, the determination unit 1062 causes the display processor 103 to display a message indicating that there is unread text on the display unit 102 (step S17). Then, the process ends. Note that an instruction may be given to re-read the text from the beginning.

In contrast, if the number of times a line break is detected is greater than or equal to the number-of-times threshold based on the number of displayed lines, it is possible to determine that the text within the range has been read. Thus, the determination unit 1062 sets "on" the determination flag for that text in the third data storage unit 108 (step S19). The determination unit 1062 causes the display processor 103 to display a message indicating completion on the display unit 102 (step S21). Then, the process ends.

By performing the above-described process, even when the gaze detector 101, which is of low accuracy, is used, it is possible to determine whether text has been read.

Although the above example describes the process of determining whether text has been read in the case where the user explicitly clicks the "next" button 1300, alternatively, for example, whether the number of times a newline is detected is greater than or equal to the threshold based on the number of displayed lines may be determined every time the number of times a newline is detected is incremented. At this time, after the number of times a newline is detected becomes greater than or equal to the number-of-times threshold based on the number of displayed lines, a button or the like may be displayed to notify the user of determination completion, or, after a certain time has elapsed, the user may be notified of determination completion.

Figure 13:
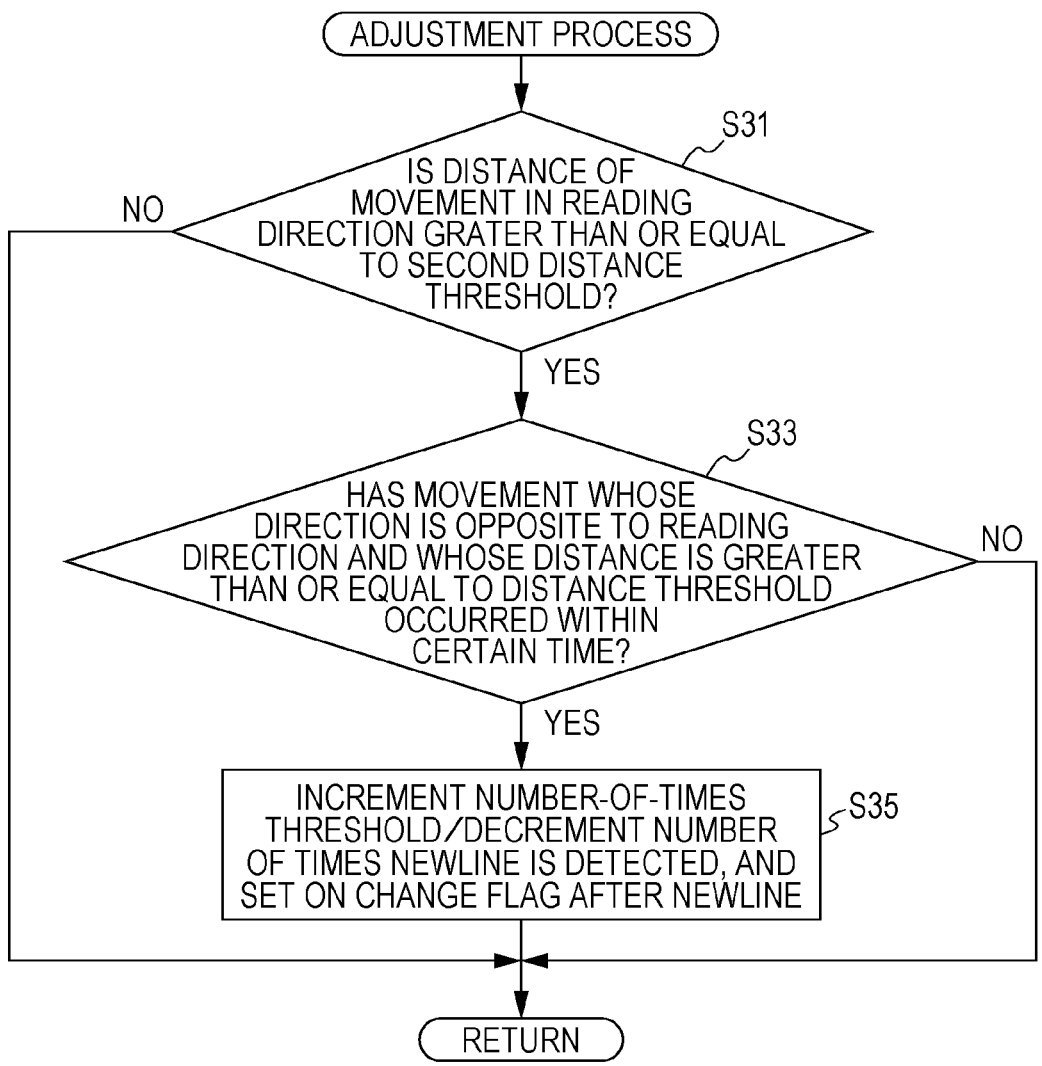
FIG. 13 is a flowchart illustrating an adjustment process according to the first embodiment.

Next, using FIGS. 13 to 15, the details of the adjustment process (step S10) will be described.

In the case where the positions before and after the movement are not within the second determination area or the distance of the movement in a direction opposite to the reading direction in the first determination area is not greater than or equal to the threshold Hmin, the change unit 1061 determines whether movement from the movement origin position to the movement destination position is movement whose direction is the reading direction and whose distance is greater than or equal to a second distance threshold (step S31). Also in this step, the condition that the positions before and after the movement are within the second determination area is similarly determined. When such movement is detected, there is a possibility that a regression has occurred. Note that the second distance threshold will be described later. In the case where the condition in step S31 is not satisfied, the process returns to the calling process.

In contrast, in the case where it is determined that the condition in step S31 is satisfied, the change unit 1061 tracks data stored in the second data storage unit 105 and determines whether movement that is in a direction opposite to the reading direction and whose movement distance is greater than or equal to the distance threshold (movement satisfying the requirements in step S9) has occurred within a certain time (step S33).

Figure 14:
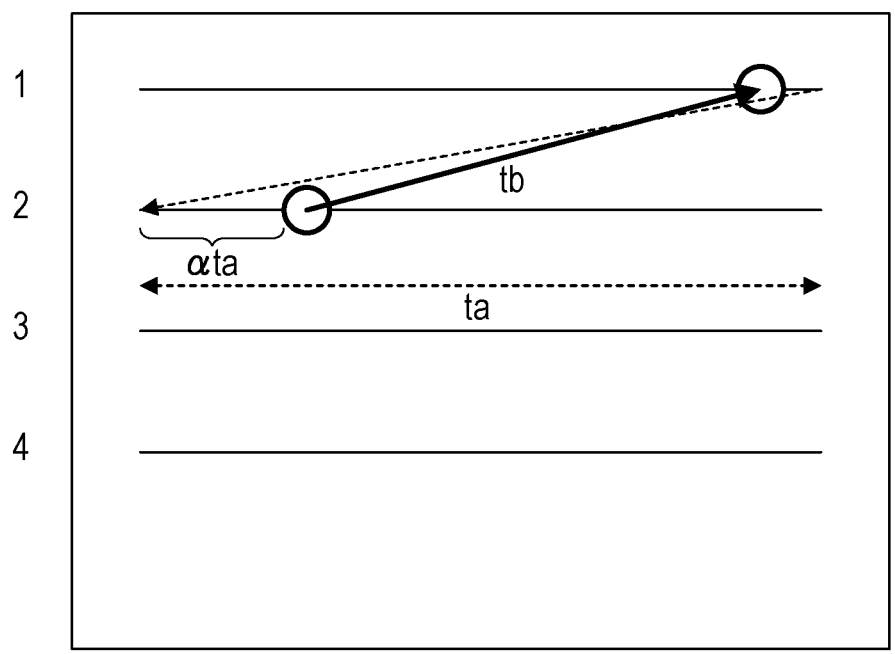
FIG. 14 is a diagram for describing the adjustment process according to the first embodiment.
Figure 15:
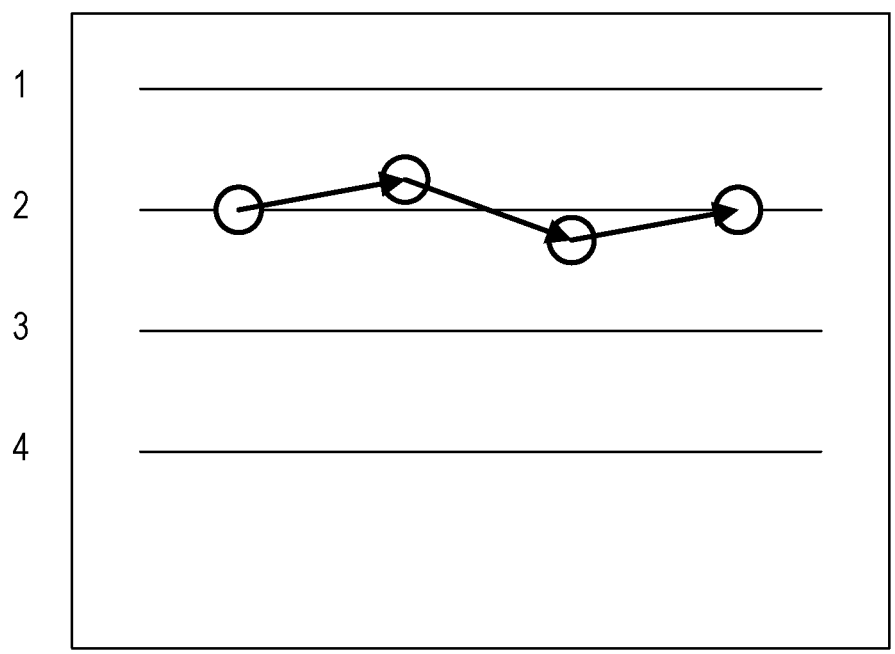
FIG. 15 is a diagram for describing the adjustment process according to the first embodiment.

In this embodiment, as illustrated in FIG. 14, the following case is assumed. Specifically, it is assumed that it takes a time ta until one line is normally read. After reading the first line, the user continues reading the second line but, before finishing the second line (specifically, at a time at which the user finishes reading the second line to a portion at a proportion of α, which is a positive value less than 1, with respect to one line), the user regresses back to the first line and re-reads the first line. In this case, the gaze position is currently on the first line. By going back the sum of a time tb for re-reading and a time αta which is the result of multiplying the time ta for normally reading the second line by the proportion a (αta+tb; for example, if α is 0.1 and the time ta for reading the entire second line is two seconds, αta is 200 ms; and, if tb is 100 ms, αta+tb is 300 ms), the gaze movement corresponding to a newline (dotted arrow; specifically, the position after the movement, which corresponds to the tip of the dotted arrow) is detected. Based on the requirement "before finishing the second line", α may be determined in advance, and, αta may be prepared by multiplying α by a time that is generally taken to read one line of the current text. In addition, ta may be obtained by measuring an interval (average) of increasing the number of times a newline is detected in step S11. For α, the maximum value may be determined, and a value less than the maximum value may be dynamically calculated from the length from the beginning-of-line position to the gaze position. In addition, in the case where a line subjected to determination includes a kanji character (Chinese character) or a difficult-to-read word, it is assumed that the value of ta may be greater than that normally taken. Thus, the value of ta may be adjusted in accordance with the content of the text.

Note that, for the second distance threshold used in step S31, a value obtained by multiplying the distance threshold used in step S9 by a correction coefficient such as (1−α) is used. Depending on circumstances, the distance threshold used in step S9 is used as it is.

In the case where the gaze movement satisfying the conditions in step S33 is not occurring, the process returns to the calling process. As schematically illustrated in FIG. 15, in the case where the user continues reading as usual after a line break, no line break will be detected within a certain time before movement in the reading direction is detected. Thus, the process simply proceeds to the next process.

In contrast, in the case where the gaze movement satisfying the conditions in step S33 is occurring, a regression illustrated in FIG. 4 and so forth is occurring. Because the gaze movement indicating a newline will occur again, the change unit 1061 increments the number-of-times threshold by one and stores the incremented number-of-times threshold in the third data storage unit 108, or decrements the number of times a newline is detected by one (step S35). In addition, the change unit 1061 sets "on" the change flag in the third data storage unit 108. Then, the process returns to the calling process.

In doing so, the number-of-times threshold or the number of times a newline is detected is appropriately changeable, thereby enabling accurately determination of whether text has been finished reading.

Second Embodiment

Figure 16:
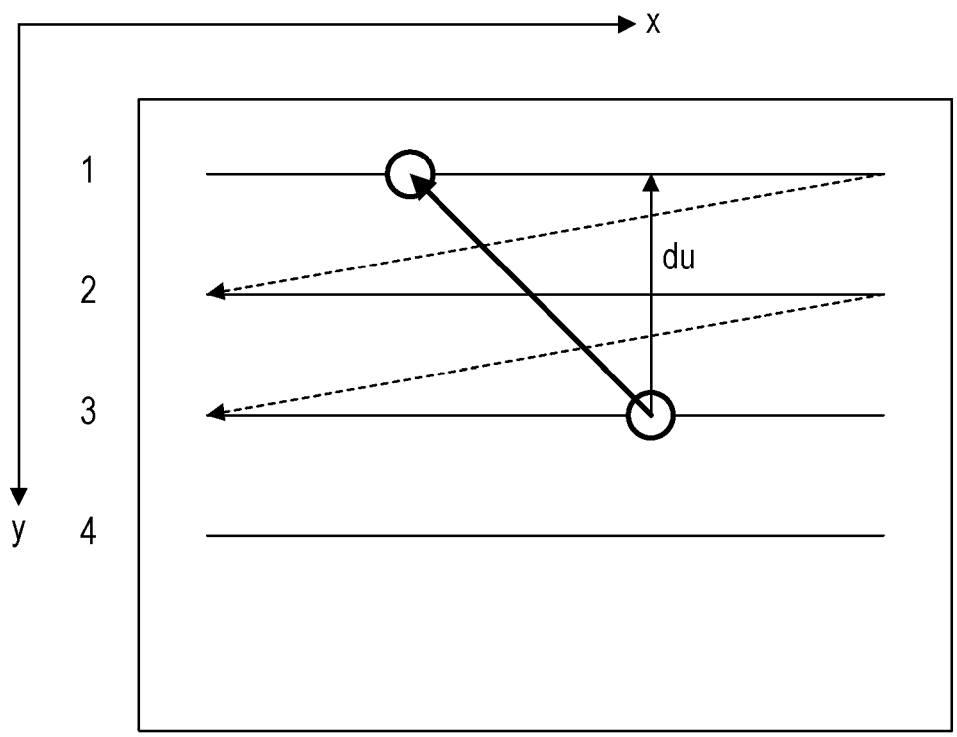
FIG. 16 is a diagram for describing the outline of a second embodiment.

Not only the example like that illustrated in FIG. 4 and so forth, but also a regression like that illustrated in FIG. 16 occurs in some cases. In the example illustrated in FIG. 16, there are cases in which, after movement indicating two newlines from the first line to the third line is detected, the gaze movement toward the first line of the text is detected. In such cases, if the user re-reads lines that are determined to have been read, newlines are similarly detected.

Figure 17:
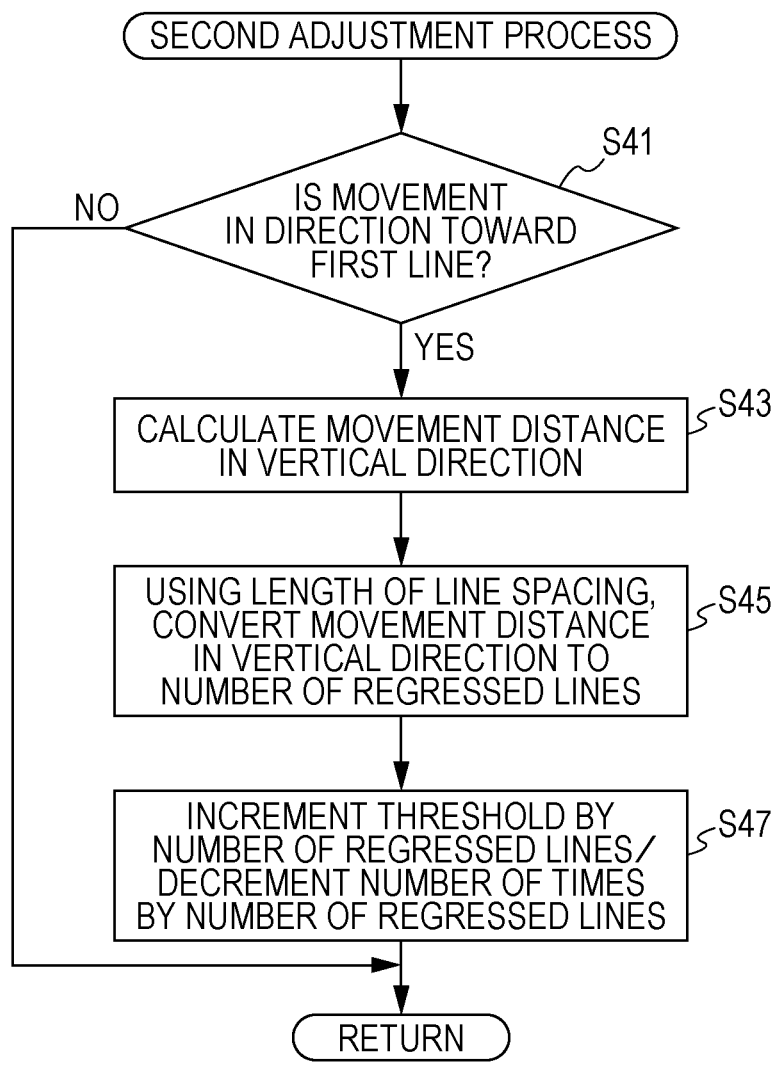
FIG. 17 is a flowchart illustrating a second adjustment process according to the second embodiment.

In a second embodiment, in order to handle such cases, a second adjustment process different from that in the first embodiment is executed. Using FIGS. 17 and 18, the second adjustment process will be described.

The change unit 1061 determines whether movement from the movement origin position to the movement destination position is movement toward the first line of the text (step S41). In the case where the currently detected movement is not movement toward the first line of the text, the process returns to the calling process.

Figure 18:
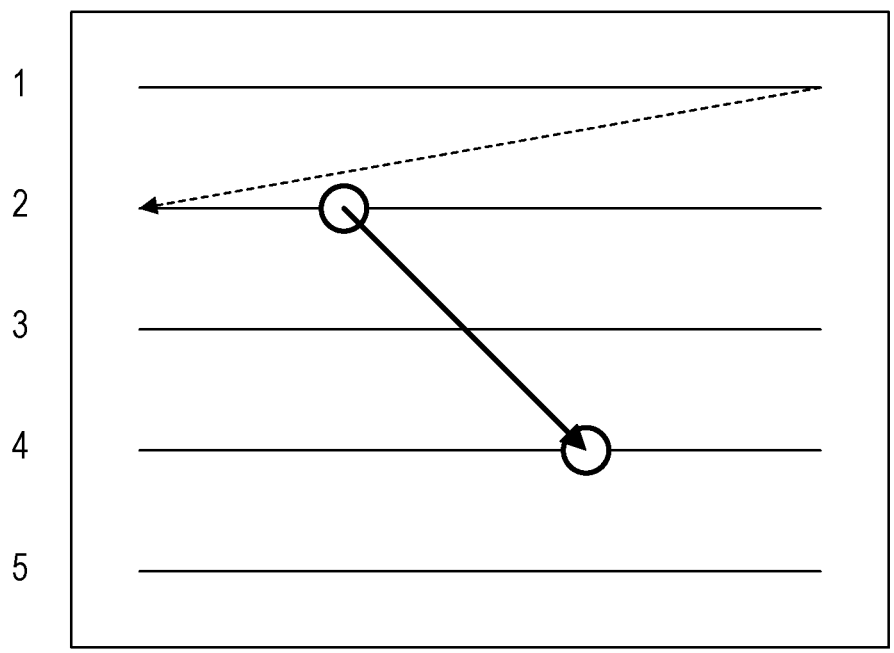
FIG. 18 is a diagram illustrating the second adjustment process according to the second embodiment.

For example, as schematically illustrated in FIG. 18, in the case where the gaze moves to the fourth line after the user finishes reading the first line and then starts reading the second line, it is impossible to determine that the user has read the second to fourth lines. Thus, the number-of-times threshold or the number of times a newline is detected is not adjusted.

In contrast, in the case where the currently detected movement is movement toward the first line of the text, the change unit 1061 calculates a movement distance du in the vertical direction with respect to the reading direction (step S43). As schematically illustrated in FIG. 16, if the horizontal direction is the x-axis and the vertical direction is the y-axis, the movement distance du in the vertical direction is calculatable from the difference between y-coordinate values.

Using the length of line spacing stored in the third data storage unit 108, the change unit 1061 converts the movement distance du in the vertical direction to the number of regressed lines (step S45). Specifically, calculation is performed in accordance with Lu=−{integer (movement distance in vertical direction/length of line spacing L)}, where integer (X) is a function representing an integer.

The change unit 1061 increments the number-of-times threshold by the number of regressed lines and stores the incremented number-of-times threshold in the third data storage unit 108, or decrements the number of times a newline is detected by the number of regressed lines (step S47). In addition, the change unit 1061 sets "on" the change flag in the third data storage unit 108. Then, the process returns to the calling process.

In doing so, the number-of-times threshold or the number of times a newline is detected is appropriately changeable, thereby enabling accurately determination of whether text has been finished reading.

Third Embodiment

Figure 19:
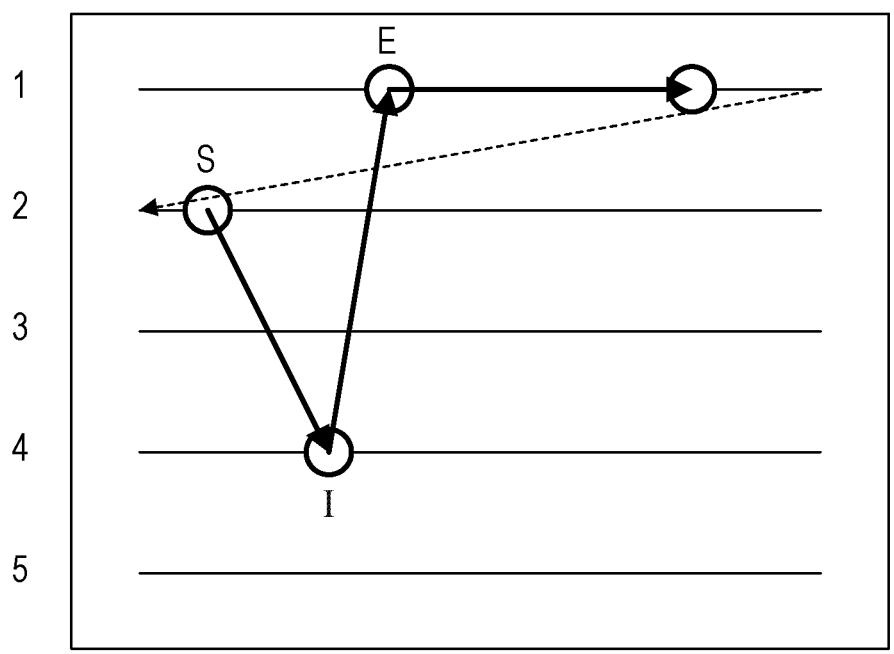
FIG. 19 is a diagram for describing the outline of a third embodiment.

There are further cases in which the gaze position moves in a complex manner. As schematically illustrated in FIG. 19, there are cases in which, while the user is reading the second line after finishing reading the first line, the gaze moves to the fourth line, and then the user returns to the first line and re-reads the first line. In such cases, a newline is normally detected up to a line at a position S where the user starts deviating from normal reading (=the position before the movement in the vertical direction); whatever the path may be to a position E at which it is confirmed that the user returns to the first line and again starts reading (the position before the normal movement), such as a path that goes through a position I on the fourth line, there is no influence on determination of whether text has been read. If a line where gaze movement corresponding to normal reading is resumed is above the position S at which the user starts deviating from normal reading, as in the second embodiment, the number-of-times threshold or the number of times a newline is detected is adjusted. Otherwise, as illustrated in FIG. 18, the number-of-times threshold or the number of times a newline is detected is not adjusted.

In a third embodiment, even when such a complex gaze movement is detected, the number-of-times threshold or the number of times a newline is detected is appropriately adjusted.

A third adjustment process according to this embodiment will be described using FIGS. 20 to 22.

Figure 20:
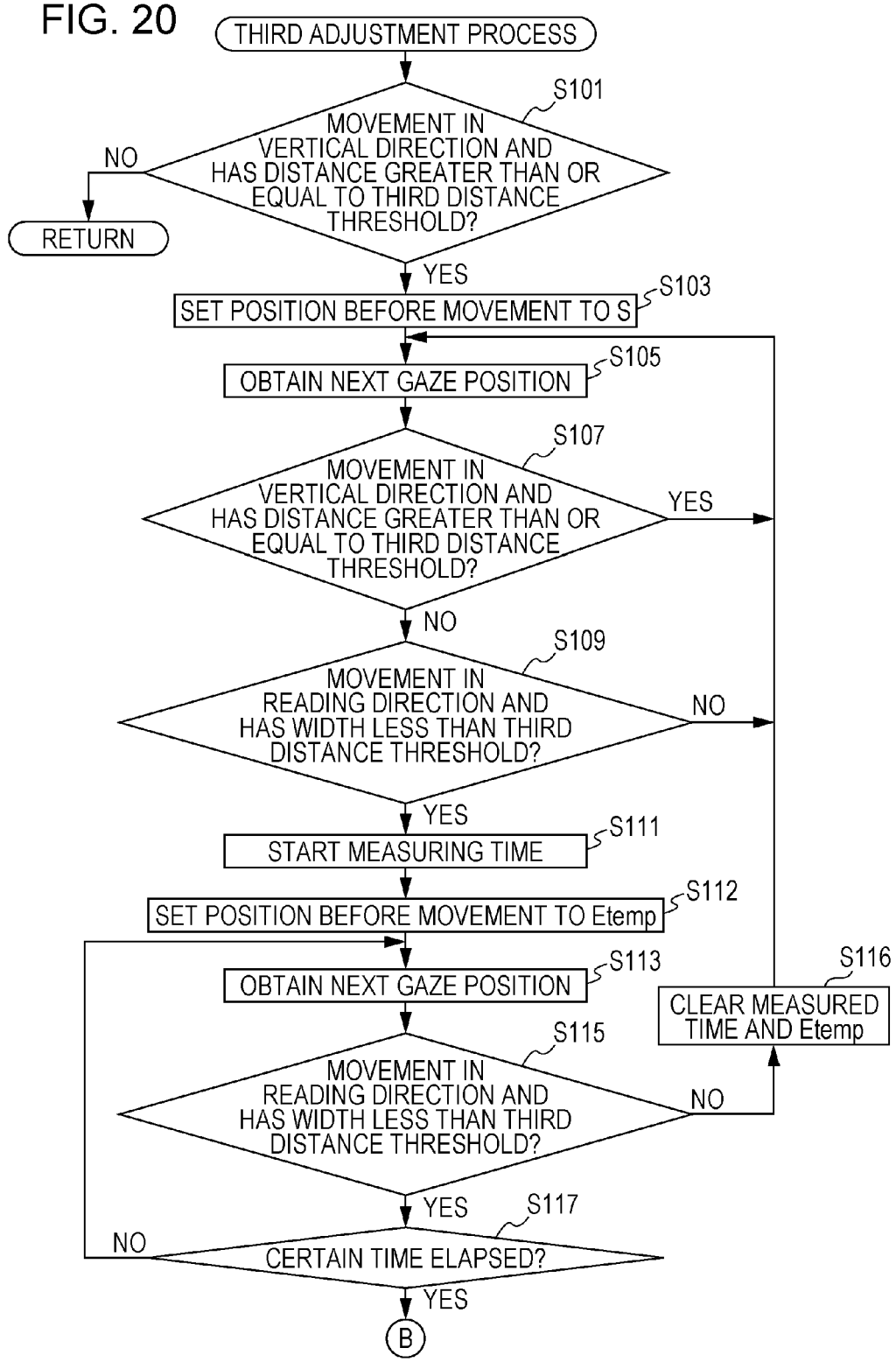
FIG. 20 is a flowchart illustrating a third adjustment process according to the third embodiment.

The change unit 1061 determines whether the currently detected movement is movement that is in a vertical direction with respect to the reading direction and that has a distance greater than or equal to a third distance threshold (step S101 in FIG. 20). As the third distance threshold, for example, a value that is about twice the gaze detection error $r_e$ is used. In the case where the currently detected movement is not the above-mentioned movement, the process returns to the calling process.

In contrast, in the case where the currently detected movement is above-mentioned movement, the change unit 1061 sets the position before the currently detected movement to S (step S103).

In addition, the change unit 1061 reads the gaze position coordinates one unit time ago from the second data storage unit 105 (step S105). As in step S101, the change unit 1061 determines whether the next movement identified from the obtained gaze position coordinates and the previous gaze position coordinates is movement that is in the vertical direction with respect to the reading direction and that has a distance greater than or equal to the third distance threshold (step S107). That is, the change unit 1061 determines whether the gaze movement in the vertical direction with respect to the reading direction is continuing. In the case where the condition in step S107 is satisfied, the process returns to step S105. Although this process flow is conditional on the fact that the gaze position moves by a certain distance or greater within one unit time, this process flow may determine whether there is movement of a certain distance or greater in the vertical direction within a short period of time.

In contrast, in the case where the condition in step S107 is not satisfied, in order to determine whether the user has started reading from the position after the movement in a stable manner, the change unit 1061 determines whether the next movement is movement that is in the reading direction and that has a width less than the third distance threshold (step S109). For example, in the case where the gaze position moves not in the vertical direction with respect to lines, but in a direction opposite to the reading direction, it is impossible to say that the user has started reading from the position after the movement in a stable manner. Thus, in the case where the condition in step S109 is not satisfied, the process returns to step S105.

In contrast, in the case where the condition in step S109 is satisfied, the change unit 1061 starts measuring time (step S111), and sets the position before the movement to Etemp (step S112). Further, the change unit 1061 obtains the gaze position coordinates one unit time later from the second data storage unit 105 (step S113).

The change unit 1061 determines whether the next movement identified from the obtained gaze position coordinates and the previous gaze position coordinates is movement within the third distance threshold in the reading direction, as in step S109 (step S115). In the case where the condition in step S115 is not satisfied, the change unit 1061 clears the time started to be measured in step S111 and Etemp set in step S112 (step S116), and the process returns to step S105.

In contrast, in the case where the condition in step S115 is satisfied, the change unit 1061 determines whether the measured time elapses a certain time (step S117). For example, as has been described using FIG. 14, βta obtained by multiplying a stable reading proportion β by the time to taken to read one line is used as the certain time.

In the case where the condition in step S117 is not satisfied, the process returns to step S113. In contrast, in the case where the condition in step S117 is satisfied, this indicates that the user continues reading lines after the movement in a stable manner. Thus, the process proceeds to a process illustrated in FIG. 21 via a terminal B. Note that the condition in step S117 may include the point that the reading speed is less than or equal to a certain speed.

Figure 21:
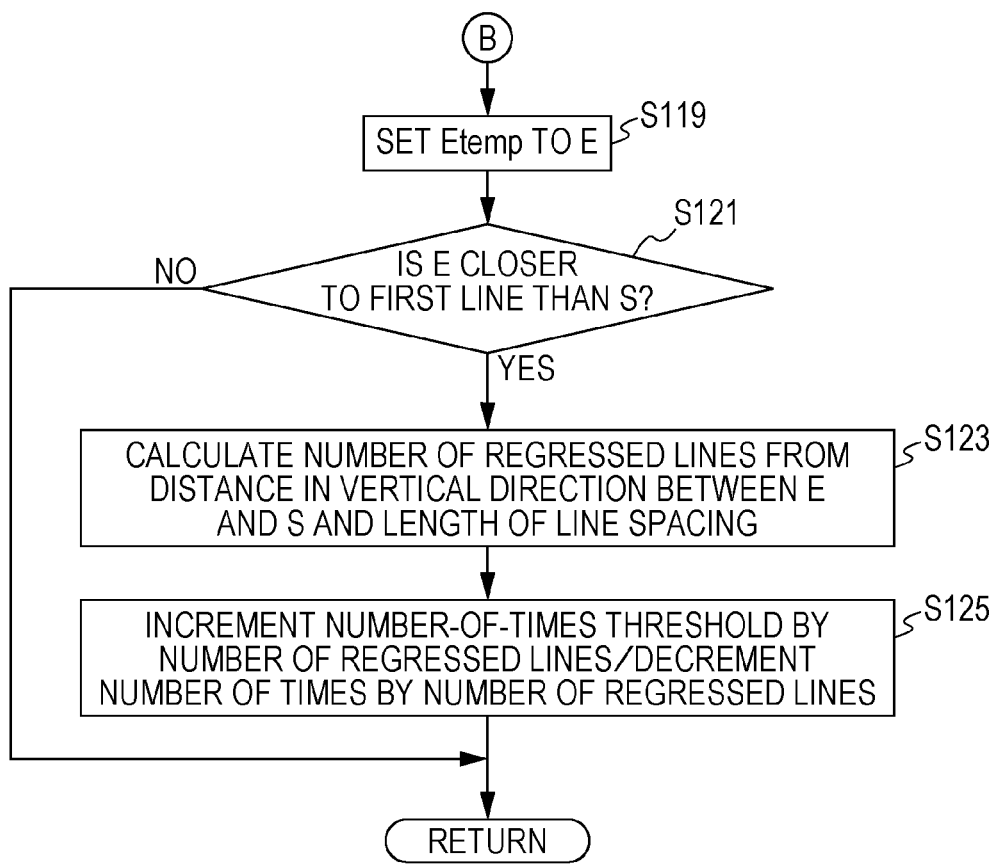
FIG. 21 is a flowchart illustrating the third adjustment process according to the third embodiment.

The description now proceeds to the process illustrated in FIG. 21. The change unit 1061 sets Etemp to E (step S119). Accordingly, the position E after the movement in FIG. 19 is obtained.

Then, the change unit 1061 determines whether E is closer to the first line than S (upper side in the example illustrated in FIG. 19) (step S121). In the case where the condition in step S121 is not sissified, the number-of-times threshold or the number of times a newline is detected is not adjusted, and the process returns to the calling process.

Figure 22:
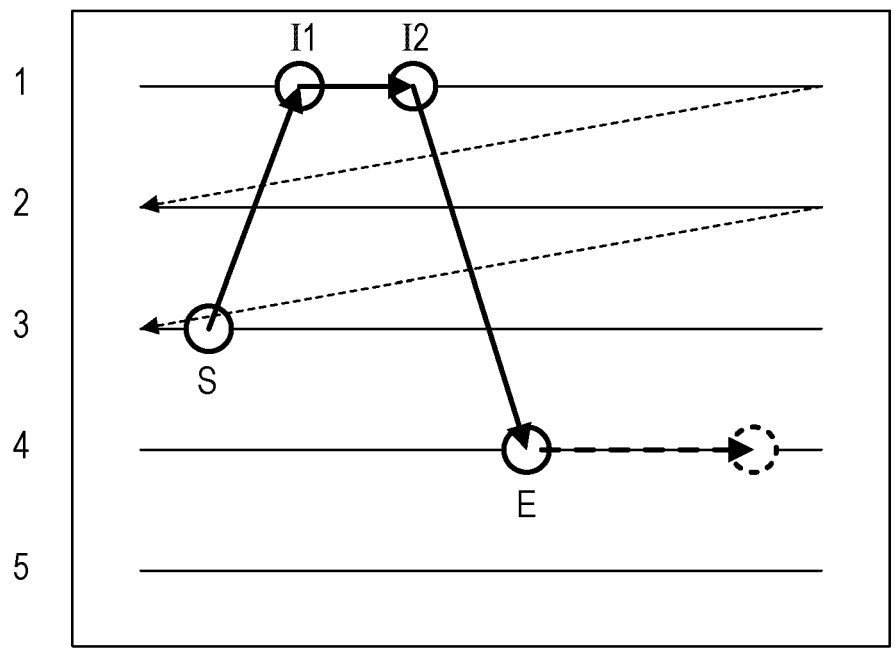
FIG. 22 is a diagram for describing the third adjustment process according to the third embodiment.

For example, as illustrated in FIG. 22, in the case where, while the user is reading through the third line after finishing reading the second line (gaze position S), the user returns to the first line, reads a little bit (gaze position I1 to I2), moves to the fourth line, and then continues reading as indicated by a dotted line, since S is lower than E, the number-of-times threshold or the number of times a newline is detected is not adjusted, and the process ends. At this time, the position of E is currently at the position illustrated in FIG. 22. However, as indicated by the dotted line, the position of E may be a final position indicated by a dotted circle at the end of the dotted line, up to which the user has fully read.

In contrast, in the case where the condition in step S121 is satisfied, the change unit 1061 converts the distance in the vertical direction between E and S to the number of regressed lines by using the length of line spacing, which is stored in the third data storage unit 108 (step S123). Specifically, calculation is performed in accordance with Lu=−{integer (movement distance in vertical direction between E and S/length of line spacing L)}.

The change unit 1061 increments the number-of-times threshold by the number of regressed lines and stores the incremented number-of-times threshold in the third data storage unit 108, or decrements the number of times a newline is detected by the number of regressed lines (step S125). In addition, the change unit 1061 sets "on" the change flag in the third data storage unit 108. Then, the process returns to the calling process.

In doing so, even when the user moves his/her gaze in such a manner to search for a place where the user should read, the number-of-times threshold or the number of times a newline is detected is appropriately changeable, thereby enabling accurately determination of whether text has been finished reading.

Although the embodiments have been described as above, the embodiments are not limited to the above-described examples. For example, the functional block configuration of the information processing apparatus 100 illustrated in FIG. 5 is only one example and may not match a program module configuration in some cases. Further, the configuration of each data storage unit may be different from a file configuration. In addition, although a horizontally written text configuration has been discussed in the embodiments, the same applies to a vertically written text configuration. In addition, the same applies to content including text, for determining whether the content has been read.

Further, regarding the process flows, similarly, the order of the steps may be changed or a plurality of steps may be executed in parallel as long as the processing result remains unchanged.

Figure 23:
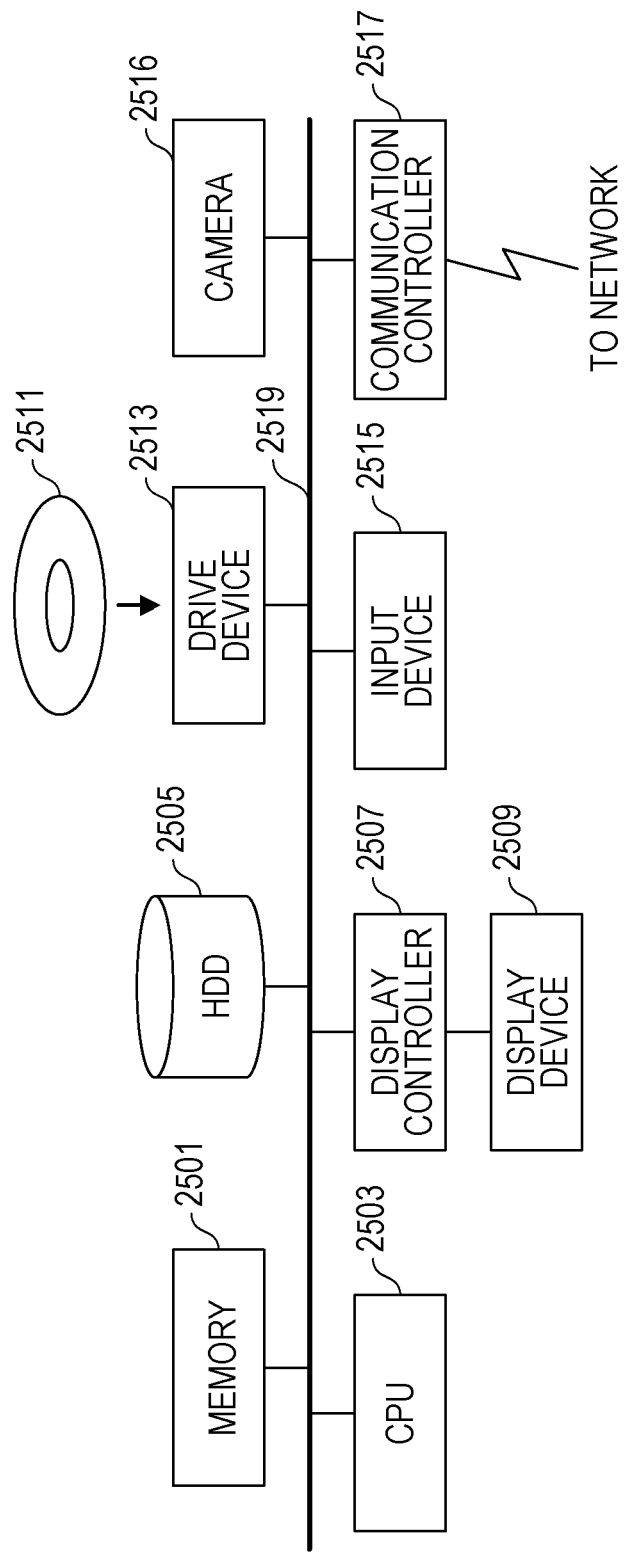
FIG. 23 is a functional block diagram of a computer.

Note that the above-described information processing apparatus 100 is a computer apparatus. As illustrated in FIG. 23, a memory 2501, a central processing unit (CPU) 2503, a hard disk drive (HDD) 2505, a display controller 2507 connected to a display device 2509, a drive device 2513 for a removable disk 2511, an input device 2515, a communication controller 2517 for connecting to a network, and a camera 2516 for capturing an image of a user in order to detect the user's gaze are connected by a bus 2519. An operating system (OS) and an application program for performing processes in the embodiments are stored in the HDD 2505, and, when the CPU 2503 executes the application program, the program is read from the HDD 2505 to the memory 2501. In accordance with the details of processing of the application program, the CPU 2503 controls the display controller 2507, the communication controller 2517, and the drive device 2513 to perform certain operations. In addition, although data being processed is mainly stored in the memory 2501, the data may be stored in the HDD 2505. In the embodiments, an application program for performing processes described in the embodiments is stored in the computer-readable removable disk 2511 and distributed, and installed from the drive device 2513 to the HDD 2505. In some cases, the application program may be installed in the HDD 2505 via a network, such as the Internet, and the communication controller 2517. Such a computer apparatus realizes various functions such as those described above by organic cooperation between hardware such as the above-described CPU 2503 and memory 2501 and a program such as the above-described application program.

The above-described embodiments are summarized as below.

An information processing apparatus according to the embodiments includes: (A) a determination unit configured to obtain a gaze position on a display screen, and to determine whether text displayed on the display screen has been completely read, based on a threshold set in accordance with the number of lines of the text and the number of times movement of the gaze position is movement indicating a newline; and (B) a change unit configured to change the threshold or the number of times in response to detection that the movement of the gaze position becomes movement of a certain distance or greater in a second direction different from a direction of movement indicating a newline.

In the case where the above-mentioned movement, different from movement indicating a newline, occurs, if attention is simply paid only to movement corresponding to a newline, an error may occur in determination of whether text has been completely read. Accordingly, by changing the threshold or the number of times, even when attention is paid to movement corresponding to a newline, it becomes possible to accurately determine whether text has been finished reading.

Note that, in the case where the above-mentioned change unit detects that the movement of the gaze position becomes movement of a certain distance or greater in a second direction different from a direction of movement indicating a newline, and, in the case where movement indicating a newline is detected within a certain time prior to the movement of the gaze position of the certain distance or greater, the threshold or the number of times may be changed. This is for handling the case in which a regression occurs in a relatively short period of time.

Note that the second direction may be a direction identical to a direction in which the text is read, and the certain distance may be a value determined in accordance with a threshold in the case of detecting movement indicating a newline. A condition in the case where a regression occurs in a relatively short period of time is like that described above.

Further, in the case where the above-mentioned change unit detects that the movement of the gaze position becomes movement of a certain distance or greater in a direction toward a first line of the text, the change unit may convert the movement distance of the gaze position in a vertical direction with respect to a direction in which the text is read to the number of lines, and may change the threshold or the number of times in accordance with the number of lines obtained by the conversion. It thus becomes possible to handle the case in which a user directly regresses back to an already read line.

In addition, (b1) in the case where, after detecting that first movement of the gaze position becomes movement of a certain distance or greater in a vertical direction with respect to a direction in which the text is read, the above-described change unit detects a state in which the movement of the gaze position continues to be in the direction in which the text is read for a certain time or greater, the change unit determines whether the gaze position upon entering the state is closer to a first line of the text than a position prior to the first movement of the gaze position; and (b2) in the case where it is determined that the gaze position upon entering the state is closer to the first line of the text than the position prior to the first movement of the gaze position, the change unit may convert a distance between the position prior to the first movement of the gaze position and the gaze position in the state, in the vertical direction with respect to the direction in which the text is read, to the number of lines, and change the threshold or the number of times in accordance with the number of lines obtained by the conversion. It thus becomes possible to handle the case in which the gaze position moves in a complex manner.

Note that a program for causing a computer to execute a process such as that described above may be generated. The program is stored in a computer-readable storage medium such as a flexible disk, an optical disc such as a compact-disc read-only memory (CD-ROM), a magneto-optical disc, a semiconductor memory (such as a ROM), or a hard disk, or a storage device. Note that data being processed is temporarily stored in a storage device such as a random-access memory (RAM).

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing apparatus, comprising:
a memory, and
a processor coupled to the memory and configured to:
obtain a gaze position of a user on a display screen,
determine whether an object for reading, displayed on the display screen, has been finished reading by the user, based on a threshold and the number of times where movement of the gaze position indicates a newline, the threshold being set in accordance with the number of lines in the object, and
change at least one of the threshold and the number of times in response to detection that the movement of the gaze position becomes movement of a certain distance or greater in a second direction different from a first direction of movement indicating a newline.

2. The information processing apparatus according to claim 1, wherein, when detecting that the movement of the gaze position becomes the movement of the certain distance or greater in the second direction, and when detecting movement indicating a newline within a certain time prior to the movement of the gaze position of the certain distance or greater, the processor is configured to change at least one of the threshold and the number of times.

3. The information processing apparatus according to claim 2,
wherein the second direction is the same direction as a direction in which the object is read, and
wherein the certain distance is a value determined in accordance with a threshold in a case of detecting movement indicating a newline.

4. The information processing apparatus according to claim 1,
wherein, when detecting that the movement of the gaze position becomes movement of a certain distance or greater in a direction toward a first line in the object, the processor is configured to:
convert the movement distance of the gaze position in a vertical direction with respect to a direction in which the object is read to the number of lines, and
change at least one of the threshold and the number of times in accordance with the number of lines obtained by the conversion.

5. The information processing apparatus according to claim 1,
wherein, after detecting that first movement of the gaze position becomes movement of a certain distance or greater in a vertical direction with respect to a direction in which the object is read, the processor is configured to:
detect a state in which the movement of the gaze position continues to be in the direction in which the object is read for a certain time or greater, and
determine whether the gaze position upon entering the state is closer to a first line in the object than a position prior to the first movement of the gaze position, and
wherein, when determined that the gaze position upon entering the state is closer to the first line in the object than the position prior to the first movement of the gaze position, the processor is configured to:
convert a distance between the position prior to the first movement of the gaze position and the gaze position in the state, in the vertical direction with respect to the direction in which the object is read, to the number of lines, and
change at least one of the threshold and the number of times in accordance with the number of lines obtained by the conversion.

6. The information processing apparatus according to claim 1,
wherein the object for reading includes text of a line configuration having the lines.

7. An information processing method, comprising:
obtaining a gaze position of a user on a display screen;
determining whether an object for reading, displayed on the display screen, has been finished reading by the user, based on a threshold and the number of times where movement of the gaze position indicates a newline, the threshold being set in accordance with the number of lines in the object; and
changing, by a processor, at least one of the threshold and the number of times in response to detection that the movement of the gaze position becomes movement of a certain distance or greater in a second direction different from a first direction of movement indicating a newline.

8. The information processing method according to claim 7,
wherein, when detecting that the movement of the gaze position becomes the movement of the certain distance or greater in the second direction, and when detecting movement indicating a newline within a certain time prior to the movement of the gaze position of the certain distance or greater, the changing changes at least one of the threshold and the number of times.

9. The information processing method according to claim 8,
wherein the second direction is the same direction as a direction in which the object is read, and
wherein the certain distance is a value determined in accordance with a threshold in a case of detecting movement indicating a newline.

10. The information processing method according to claim 7,
wherein, when detecting that the movement of the gaze position becomes movement of a certain distance or greater in a direction toward a first line in the object, the changing converts the movement distance of the gaze position in a vertical direction with respect to a direction in which the object is read to the number of lines, and the changing changes at least one of the threshold and the number of times in accordance with the number of lines obtained by the conversion.

11. The information processing method according to claim 7,
wherein, after detecting that first movement of the gaze position becomes movement of a certain distance or greater in a vertical direction with respect to a direction in which the object is read, the changing detects a state in which the movement of the gaze position continues to be in the direction in which the object is read for a certain time or greater, and the changing determines whether the gaze position upon entering the state is closer to a first line in the object than a position prior to the first movement of the gaze position, and
wherein, when determined that the gaze position upon entering the state is closer to the first line in the object than the position prior to the first movement of the gaze position, the changing converts a distance between the position prior to the first movement of the gaze position and the gaze position in the state, in the vertical direction with respect to the direction in which the object is read, to the number of lines, and the changing changes at least one of the threshold and the number of times in accordance with the number of lines obtained by the conversion.

12. A non-transitory computer-readable recording medium storing a program that causes a computer to execute a procedure, the procedure comprising:
obtaining a gaze position of a user on a display screen;
determining whether an object for reading, displayed on the display screen, has been finished reading by the user, based on a threshold and the number of times where movement of the gaze position indicates a newline, the threshold being set in accordance with the number of lines in the object; and
changing at least one of the threshold and the number of times in response to detection that the movement of the gaze position becomes movement of a certain distance or greater in a second direction different from a first direction of movement indicating a newline.

* * * * *